Jan. 26, 1965 N. S. BARLAMENT ETAL Re. 25,718

APPARATUS FOR CUTTING ARTICLES

Original Filed June 3, 1957 12 Sheets-Sheet 1

INVENTORS
NORVAL S. BARLAMENT
SAMUEL J. CAMPBELL

BY Hans G. Hoffmeister
ATTORNEY

APPARATUS FOR CUTTING ARTICLES

Original Filed June 3, 1957 12 Sheets-Sheet 2

INVENTORS
NORVAL S. BARLAMENT
SAMUEL J. CAMPBELL

BY Hans G. Hoffmeister
ATTORNEY

APPARATUS FOR CUTTING ARTICLES

Original Filed June 3, 1957 12 Sheets-Sheet 3

INVENTORS
NORVAL S. BARLAMENT
SAMUEL J. CAMPBELL

BY Hans G. Hoffmeister
ATTORNEY

APPARATUS FOR CUTTING ARTICLES

Original Filed June 3, 1957 12 Sheets-Sheet 4

INVENTORS
NORVAL S. BARLAMENT
SAMUEL J. CAMPBELL

BY Hans G. Hoffmeister
ATTORNEY

APPARATUS FOR CUTTING ARTICLES

Original Filed June 3, 1957 12 Sheets-Sheet 5

INVENTORS
NORVAL S. BARLAMENT
SAMUEL J. CAMPBELL

BY Hans G. Hoffmeister
ATTORNEY

APPARATUS FOR CUTTING ARTICLES
Original Filed June 3, 1957 12 Sheets-Sheet 6
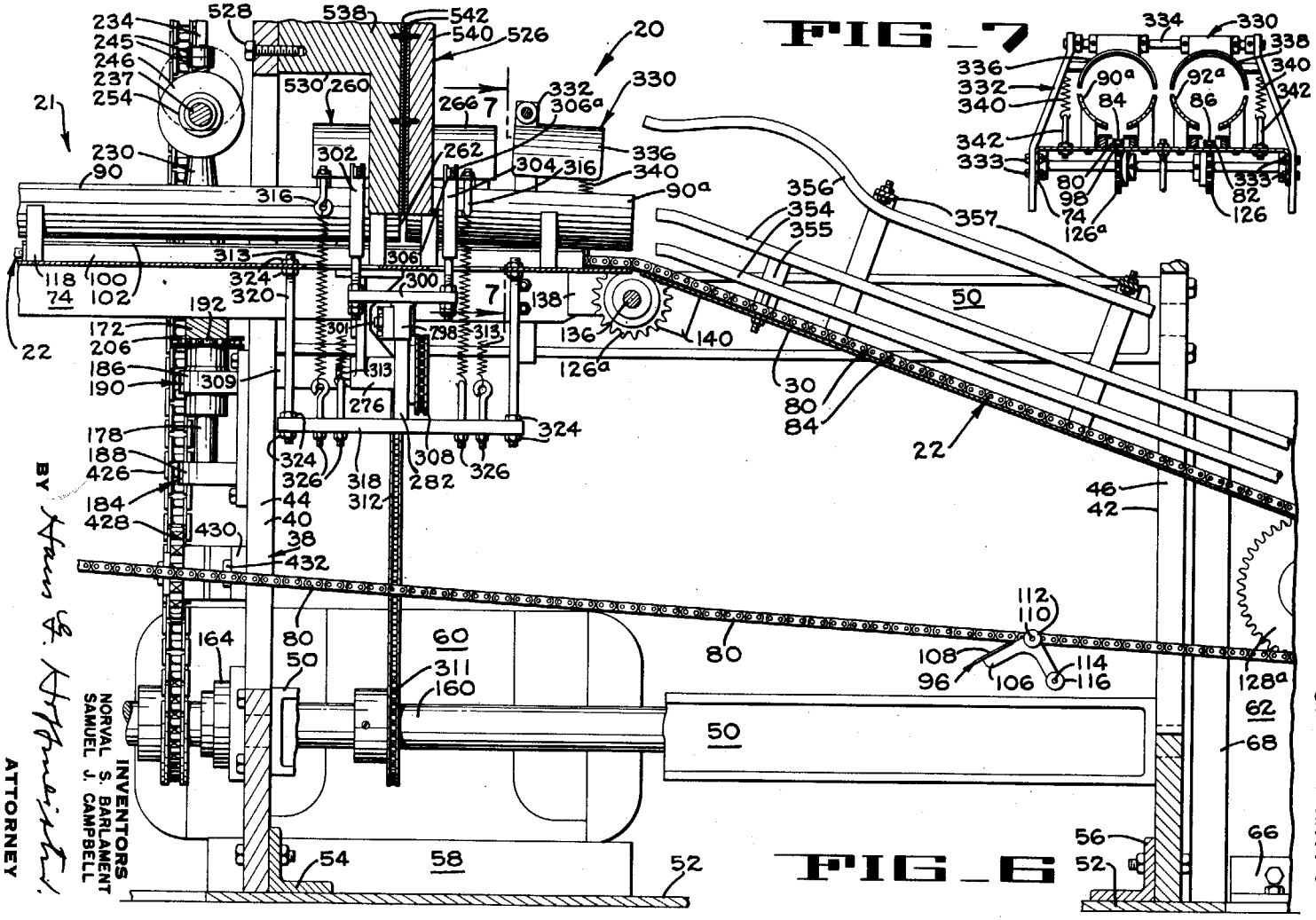
INVENTORS
NORVAL S. BARLAMENT
SAMUEL J. CAMPBELL
BY Hans G. Hoffmeister
ATTORNEY

APPARATUS FOR CUTTING ARTICLES

Original Filed June 3, 1957 12 Sheets-Sheet 7

INVENTORS
NORVAL S. BARLAMENT
SAMUEL J. CAMPBELL

BY Hans G. Hoffmeister
ATTORNEY

APPARATUS FOR CUTTING ARTICLES
Original Filed June 3, 1957 12 Sheets-Sheet 8
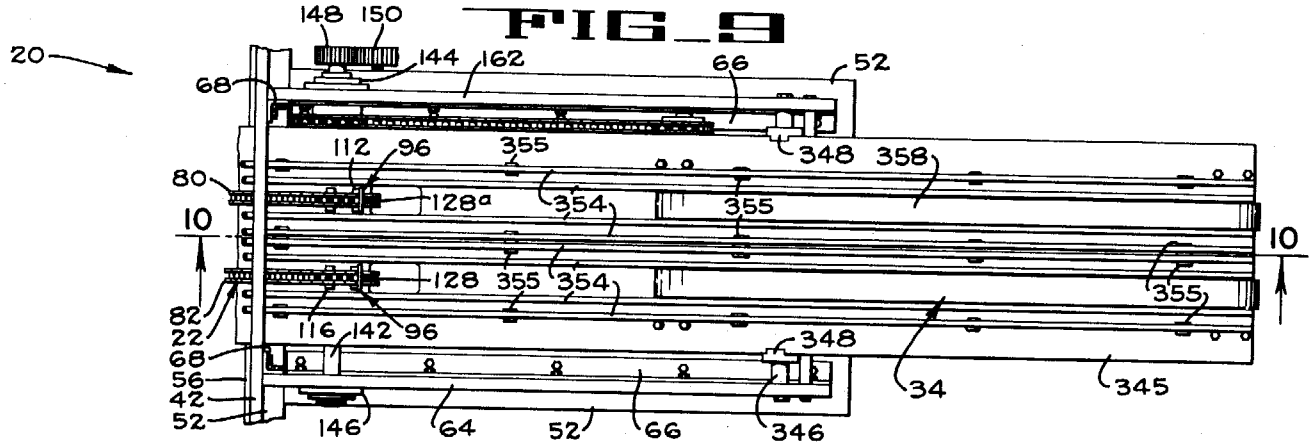
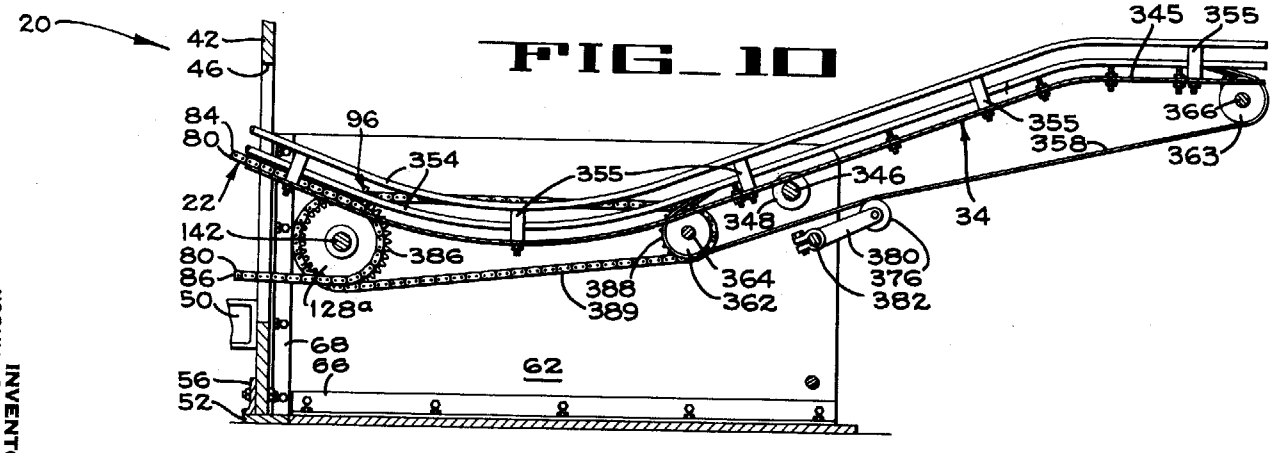
INVENTORS
NORVAL S. BARLAMENT
SAMUEL J. CAMPBELL
BY Hans G. Hoffmeister
ATTORNEY

APPARATUS FOR CUTTING ARTICLES

Original Filed June 3, 1957 12 Sheets-Sheet 9

INVENTORS
NORVAL S. BARLAMENT
SAMUEL J. CAMPBELL

BY Hans G. Hoffmeister
ATTORNEY

APPARATUS FOR CUTTING ARTICLES

Original Filed June 3, 1957 12 Sheets-Sheet 10

INVENTORS
NORVAL S. BARLAMENT
SAMUEL J. CAMPBELL

BY Hans G. Hoffmeister
ATTORNEY

INVENTORS
NORVAL S. BARLAMENT
SAMUEL J. CAMPBELL
BY Hans G. Hoffmeister
ATTORNEY

APPARATUS FOR CUTTING ARTICLES

Original Filed June 3, 1957 12 Sheets-Sheet 12

INVENTORS
NORVAL S. BARLAMENT
SAMUEL J. CAMPBELL
BY Hans G. Hoffmeister
ATTORNEY United States Patent Office Re. 25,718

Reissued Jan. 26, 1965

25,718

APPARATUS FOR CUTTING ARTICLES

Norval S. Barlament and Samuel J. Campbell, Green Bay, Wis., assignors to FMC Corporation, a corporation of Delaware Original No. 3,049,954, dated Aug. 21, 1962, Ser. No. 663,119, June 3, 1957. Application for reissue May 6, 1963, Ser. No. 278,813

11 Claims. (Cl. 83—201)

Matter enclosed in heavy brackets [ ] appears in the original patent but forms no part of this reissue specification; matter printed in italics indicates the additions made by reissue.

This invention pertains to apparatus for cutting articles made of paper or the like, and more particularly relates to an improved apparatus for cutting a log of rolled or bundled paper into a plurality of shorter lengths, such as individual, consumer-length rolls of paper toweling or toilet tissue.

The production of products in the form of short rolls of paper presents several problems due to the fact that a thin ribbon of paper of narrow width will tear easily during a winding operation and such a ribbon is difficult to wind uniformly on a core. These problems are made more difficult by the provision of the usual transverse perforated lines found in rolls of toilet tissue and paper toweling, since such lines weaken the paper. It is evident that if the ribbon of paper breaks as the roll is being wound on the core, the machine must be shut down and the partially formed roll must be spliced or scrapped entirely. Such breakages make the production of these products an inefficient, costly operation.

The apparatus of the present invention is designed to overcome the above stated limitations and to greatly increase the production capacity of machines for producing rolled paper products. This is accomplished by winding a relatively wide ribbon of paper onto a core to form a long log of paper of the desired diameter. The log is then cut into individual short rolls of the desired length. The strength of the wide ribbon of paper prevents tearing and permits a relatively faster movement of the ribbon, while the cutting operation prevents telescoping of individual rolls and assures the formation of short rolls having flat end walls.

It is, therefore, one object of the present invention to provide an improved apparatus for cutting a plurality of short paper rolls or the like from a long log of paper.

Another object is to provide an improved apparatus for cutting rolled logs of paper into a plurality of individual rolls of predetermined length.

Another object is to provide an automatic apparatus for increasing the rate of production of rolled paper articles.

Another object is to provide improved cutting means for an apparatus of the type described, which cutting means is maintained in a constantly sharpened condition without requiring shutdown or disassembly of the apparatus.

Another object is to provide an improved means for holding logs of paper in a fixed position while cutting the same.

These and other objects and advantages of the present invention will become apparent from the following description and accompanying drawings in which:

FIGURE 6 is a vertical section, with parts broken away, taken along the line 6—6 of FIG. 4.

FIGURE 7 is a section taken along the line 7—7 of FIG. 6.

FIGURE 9 is a top plan view of the discharge portion of the apparatus.

FIGURE 10 is a vertical section taken along line 10—10 of FIGURE 9.

Figure 1:
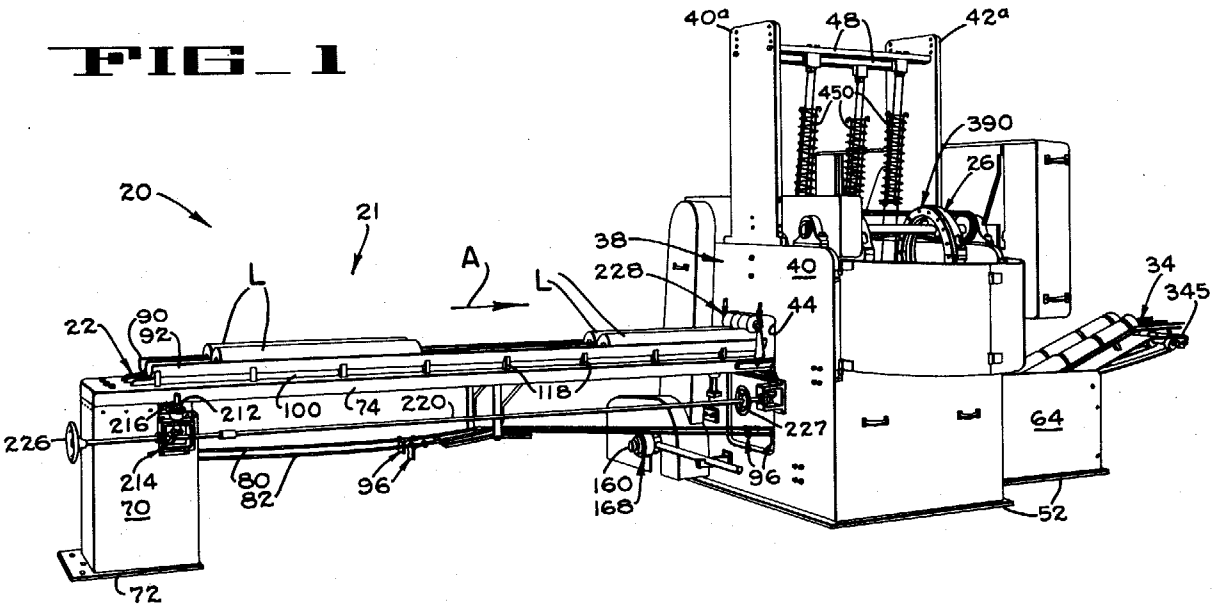
FIGURE 1 is a perspective of the paper log cutting apparatus of the present invention.

The log cutting apparatus 20 (FIGS. 1, 2 and 3) of the present invention comprises in general a conveying system 21 which includes a feed conveyor 22 that is arranged to receive and advance a pair of rolled paper logs L in side by side relation. The feed conveyor 22 intermittently advances the logs into a predetermined cutting position where a band knife 24 (FIG. 2) of a band knife assembly 26 is arranged to be moved downwardly to contact and sever the logs into a plurality of individual consumer length rolls. The band knife 24 is disposed above the conveyor 22 and is arranged to be vertically reciprocated in timed relation with the intermittent movement of the feed conveyor 22. On each downward stroke of the band knife 24, the forward or cutting run 28 (FIG. 2) of the knife 24 severs a paper roll of predetermined length from the end of each of the two logs which have been advanced into position under the knife 24 by the conveyor 22. During the upward stroke of the knife 24 and after the knife has moved upwardly to a point above the upper surface of the logs, the logs are advanced a distance equal to the desired length of a finished roll and the portions of the log which have already been severed into consumer size rolls are pushed by the following logs, down an inclined portion or plate 30 of the feed conveyor 22. The finished rolls are thereafter forced onto a discharge conveyor 34 of the system 21 which serves to advance the rolls to any suitable receptacle for removing the same from the log cutting apparatus 20.

The log cutting apparatus 20 more specifically includes a frame 38 (FIG. 2) which comprises a pair of spaced vertical front and rear plates 40 and 42, respectively, that are disposed transversely of the conveyor system 21 and are provided with aligned openings 44 and 46 (FIGS. 1 and 4), respectively, through which a section of the conveying system 21 extends. The plates 40 and 42 have upwardly projecting extensions 40a and 42a, respectively, which are held in rigid spaced relationship by longitudinally extending spacer bars 48 (FIG. 1) while the plates 40 and 42 are held in spaced relationship by spacer bars 50 (FIG. 4) and a base plate 52. The base plate 52 is secured to the plates 40 and 42 by means of angle members 54 and 56 (FIG. 2), respectively. The base plate 52 receives a motor support 58 upon which a drive motor 60 is mounted. The base plate 52 also projects rearwardly of the plate 42 to form the base for a pair of spaced, longitudinally extending supporting plates 62 and 64 (FIG. 3) which are bolted to the base plate 52 through horizontal angle members 66 and to the plate 42 through vertical angle members 68. At the forward end of the machine, an end pedestal 70 (FIGS. 1 and 2) is rigidly secured to a base plate 72 and serves to support the inlet end of the feed conveyor 22. One end of an elongated channel shaped table 74 of the feed conveyor 22 is supported on the pedestal 70 while the other end is supported from the vertical plate 40.

Figure 8:
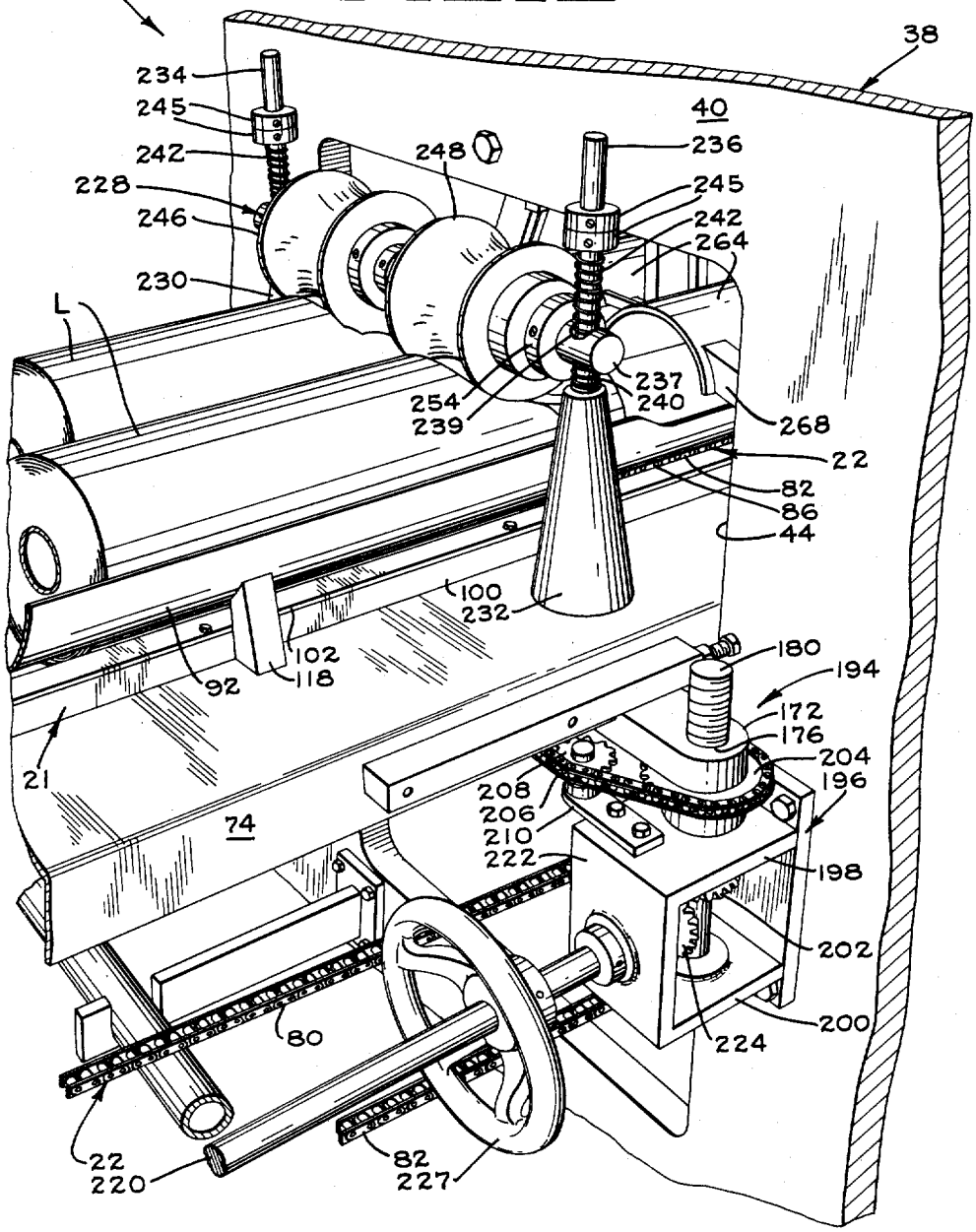
FIGURE 8 is a perspective of a portion of the apparatus taken looking in the general direction of the arrows 8—8 in FIG. 3.

The feed conveyor 22 (FIGS. 2 and 3) comprises a pair of spaced endless chains 80 and 82 which are mounted in such a manner that their upper runs 84 and 86 ride along the upper surface of the table 74 and down a portion of the inclined plate 30 which is pivotally connected to the discharge end of the table 74. A pair of longitudinally slotted, semicylindrical log guide troughs 90 and 92 (FIGS. 1 and 8) are mounted on the table 74 and extend parallel to and above the chains 80 and 82, respectively. Longitudinal slots 94 (FIG. 12) are provided in the troughs 90 and 92 directly above the respective chains 80 and 82 to allow pushers 96, which are pivotally mounted at spaced intervals on the chains 80 and 82, to project through the slots 94 for contacting and slidably advancing the logs along the troughs 90 and 92.

Figure 5:
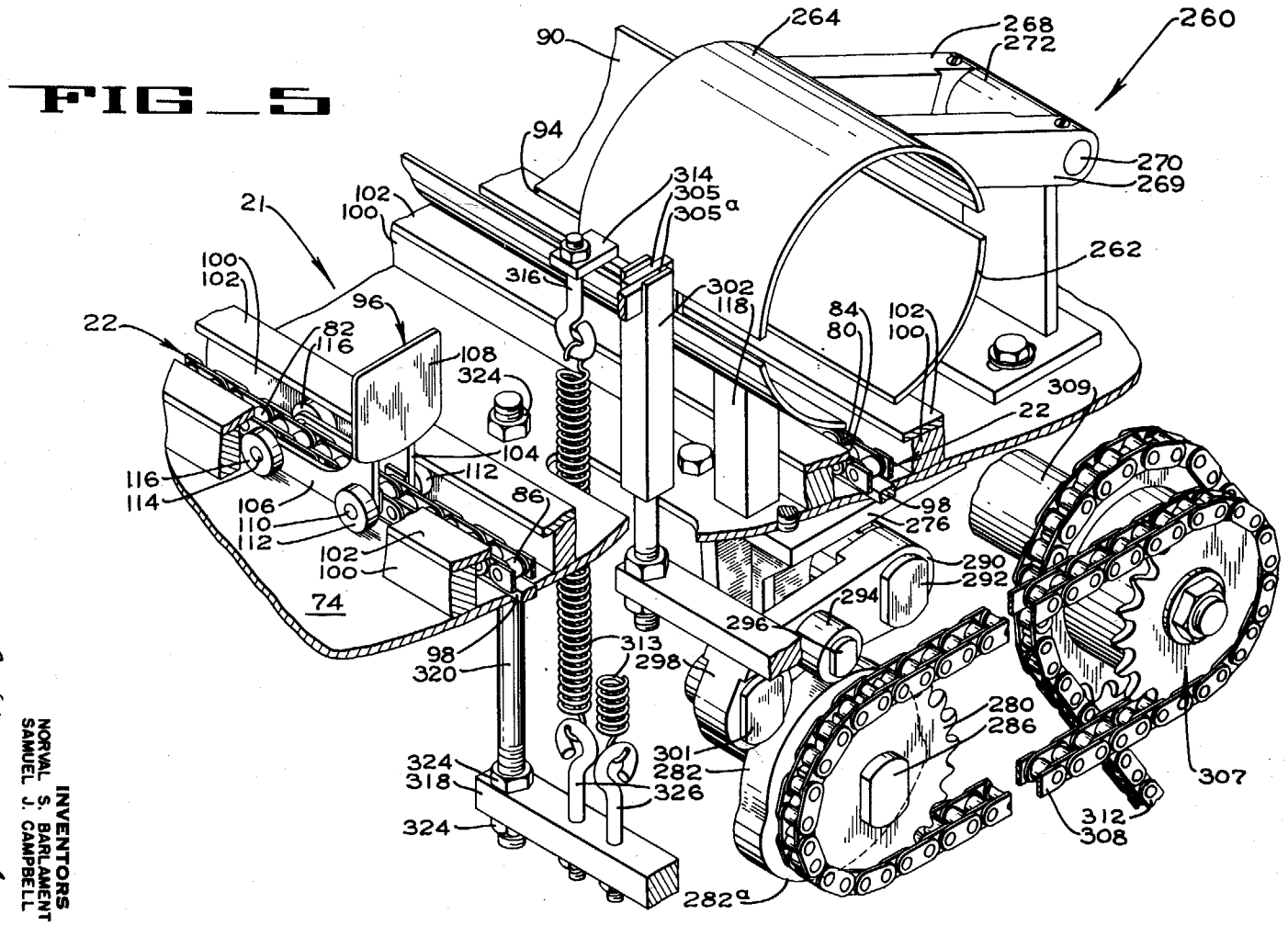
FIGURE 5 is a perspective of a portion of the apparatus taken in the general direction indicated by arrow 5 in FIG. 2.

As best shown in FIG. 5, each of the chains 80 and 82 straddles a bar 98 which is rigidly secured to the table 74 and is disposed between two parallel guide members 100. The guide members 100 are secured, as by welding, to the table 74 and are provided with top flange plates 102 on their upper surfaces for the purpose of guiding the pushers 96 and for preventing lateral pivotal movement and deflection of the same from between the guide members 100. Each pusher 96 comprises a pair of spaced L-shaped members 104 and 106 which are rigidly interconnected by a pad 108 and are arranged to straddle the particular chain 80 or 82 upon which the pusher is mounted. Each pusher 96 is mounted on its associated chain by means of an elongated connecting pin 110 which extends through the chain and through the L-shaped members 104 and 106 and has rollers 112 mounted for rotation on the opposite ends thereof. A pin 114 is secured, as by welding, to the rearward end of each of the L-shaped members 104 and 106 and each pin 114 has a roller 116 rotatably mounted thereon. The rollers 112 and 116 may roll against the upper surface of the table 74 or against the lower surface of the flange plates 102 and hence are maintained in desired position between the guide members 100. The guide troughs 90 and 92 are supported on the table 74 by a plurality of pedestals 118 (FIG. 1).

Since the different parts used for driving each of the chains 80 and 82 are identical, only those parts which are associated with the chain 82 will be described in detail, while those identical parts associated with the chain 80 will be given the same reference numeral followed by a suffix "a."

Figure 2:
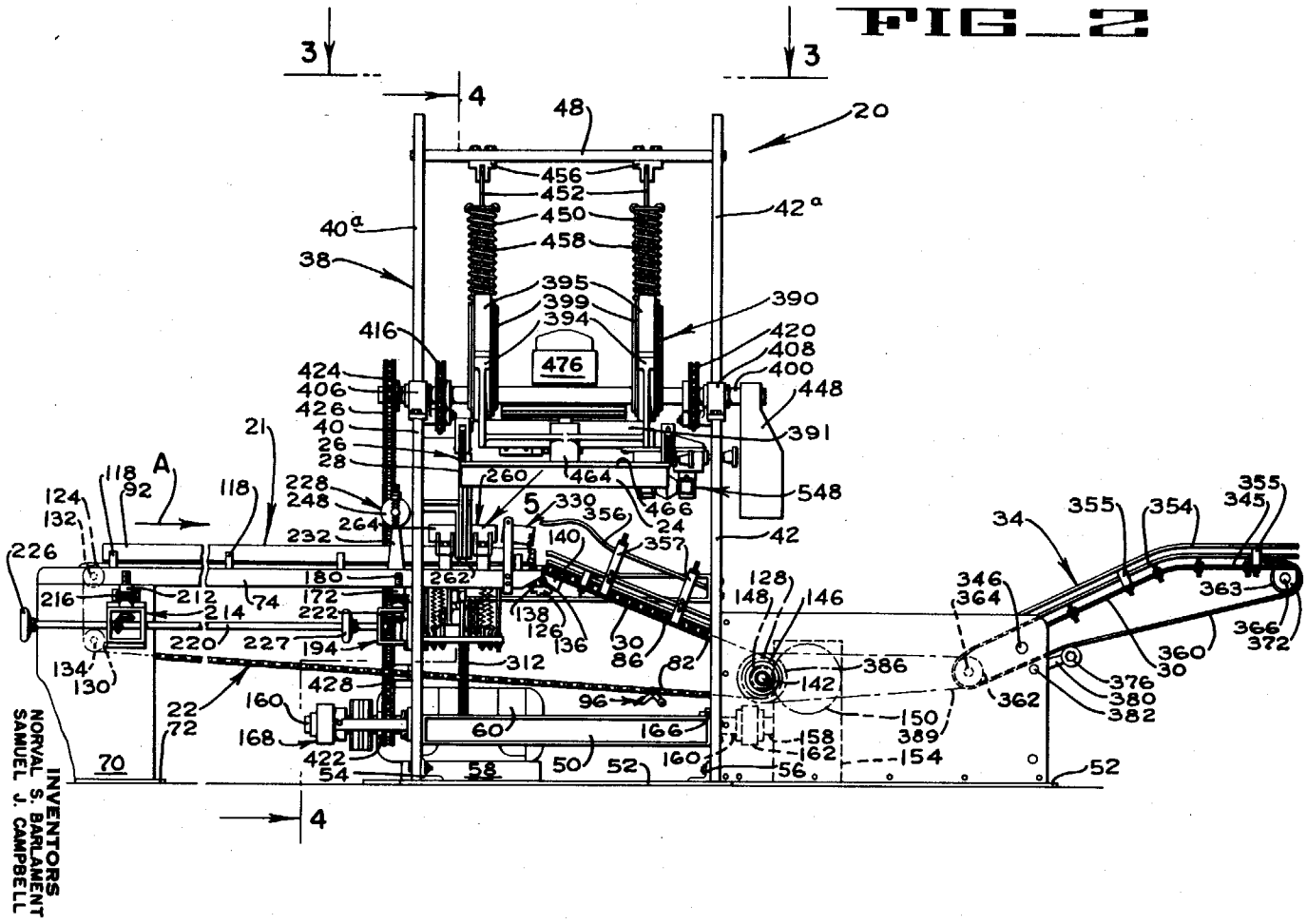
FIGURE 2 is a side elevation, partly broken away, of the apparatus of FIG. 1.
Figure 3:
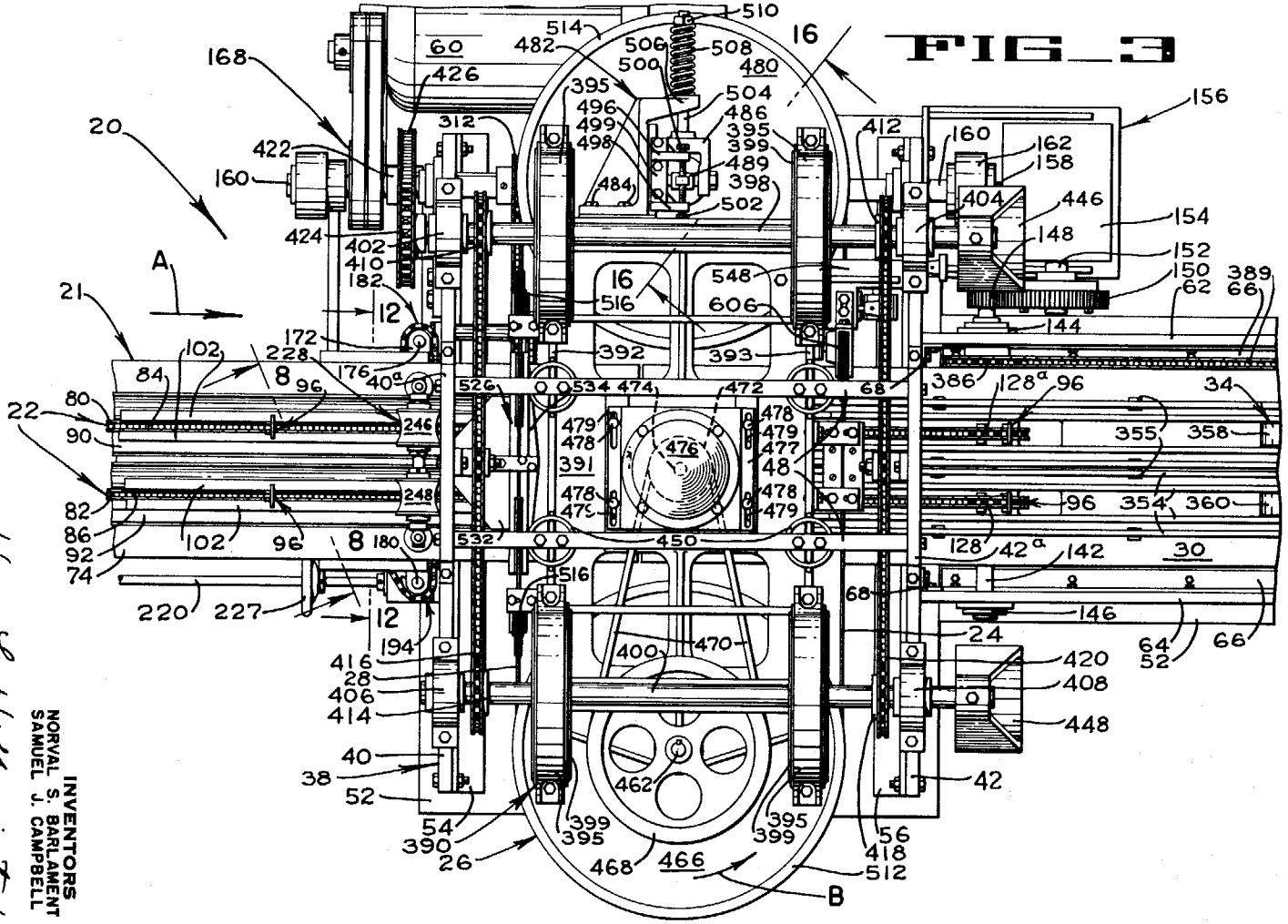
FIGURE 3 is a fragmentary plan view of a portion of the apparatus indicated generally by arrows 3—3 in FIG. 2.

The chain 82 is trained around an idler sprocket 124 (FIG. 2), an idler sprocket 126, a drive sprocket 128 and an idler sprocket 130. The sprocket 124 is keyed on a shaft 132 which extends laterally of the table 74 and is journalled for rotation on the table 74 adjacent the inlet end thereof. The sprocket 130 is keyed on a shaft 134 which is positioned below and parallel to the shaft 132 and is disposed within the pedestal 70. The shaft 134 is journalled on suitable brackets (not shown) which are bolted to the lower surface of the table 74. The idler sprocket 126 is mounted for rotation on a shaft 136 which is secured to the discharge end of the table 74 by means of several brackets 138 that are, in turn, bolted to the table 74. The shaft 136 also serves as a pivotal axis for the inclined plate 30 and is pivotally disposed in brackets 140 depending from the plate 30. The drive sprocket 128 is keyed to a conveyor drive shaft 142 which is journalled for rotation in bearings 144 and 146 (FIG. 3). The bearing 144 is bolted to the support plate 62 while the bearing 146 is bolted to the opposite support plate 64. A gear 148 is keyed to the shaft 142 and is positioned in driving engagement with a drive gear 150 that is mounted on the output shaft 152 of any suitable intermittent driving unit, such as a Ferguson or a Geneva drive 154. The intermittent driving unit 154 is mounted on a rigid bracket 156 that is bolted to the plate 42 of the frame 38. The input shaft 158 of the intermittent driving unit 154 is coupled to a main drive shaft 160 by means of a flexible coupling 162. The main drive shaft 160 is journalled in spaced bearings 164 (FIG. 6) and 166 (FIG. 2) which are secured to the plates 40 and 42, respectively, of the frame 38. The drive motor 60 is connected to the drive shaft 160 by a V-belt transmission and clutch assembly 168 which is arranged to drive the main drive shaft 160 in one direction only.

The motor 60 and intermittent driving unit 154 are arranged to intermittently drive the upper runs 84 and 86 of the chains 80 and 82, respectively, in the direction of the arrow A (FIGS. 1 and 3). Hence, the pushers 96 on the chains 80 and 82 will contact logs of rolled paper placed in the troughs 90 and 92 and will intermittently force the logs to move into cutting position to be severed by the knife 24. The intermittent driving unit 154 is arranged to move the pushers a distance equal to the length of a finished, consumer-size roll each time the feed conveyor 22 is actuated.

As will be explained in more detail later, the vertical stroke of the band knife assembly 26 is constant. Therefore, in order to compensate for knife wear and to assure a complete severing of the logs to form the independent rolls, the table 74 and supported structure are arranged to be vertically adjusted.

In order to raise and lower the discharge end of the table 74 and the parts supported thereby, the discharge end of the table is mounted on a supporting bar 172 (FIGS. 8 and 12) which extends transversely of and is secured to the lower edges of the table 74. The outer end portions of the bar 172 are provided with threaded openings 174 and 176 which have vertically extending shafts 178 and 180, respectively, screwed therein. The shaft 178 is a part of a table adjusting device 182 comprising a bracket 184, which is bolted to the plate 40 and is provided with outwardly directed ears 186 and 188 which are apertured to receive the shaft 178 for rotation therein. A collar 190 is secured on the shaft 178 immediately below the ear 186 while a sprocket 192 is keyed to the shaft 178 and is disposed immediately above the ear 186. Thus, the collar 190 and the sprocket 192 provide means of preventing axial movement of the shaft 178.

The shaft 180 (FIG. 8) is a part of a second table adjusting device 194 and is supported in a box bracket 196 that is bolted to the plate 40. An upper wall 198 and a lower wall 200 of the bracket 196 are apertured to rotatably receive the shaft 180 therein. A bevel gear 202 is keyed to the shaft 180 and is disposed immediately below the upper wall 198 while a sprocket 204, which is the same size as the sprocket 192, is also keyed to the shaft 180 and is disposed immediately above the wall 198, hence preventing axial movement of the shaft 180. A drive chain 206 is trained around the sprockets 192 and 204 (FIG. 12) and around a chain tensioning sprocket 208 which is journalled on a bracket 210 that is bolted to the upper wall 198. Thus, rotation of the shaft 180 also causes rotation of the shaft 178, because of the interconnecting chain 206, with the result that the bar 172 and the discharge end of the table 74 supported thereon are moved either up or down depending upon the direction of rotation of the shaft 180.

The forward end of the table 74 is mounted on a support bar 212 (FIGS. 1 and 2) which is identical to the support bar 172. The support bar 212 is threadedly received at one end on a table adjusting device 214 which is substantially the same as the device 194 and is bolted to one side of the pedestal 70. Another table adjusting device (not shown), which is identical to the device 182, is mounted on the other side of the pedestal 70 and is received in threaded engagement with the other end of the bar 212. The two table adjusting devices at the inlet end of the apparatus are interconnected by a chain 216 and operate in an identical manner to the previously described devices 182 and 194 and therefore will not be described in greater detail. For actuating all four table adjusting devices simultaneously, thereby raising or lowering the table 74 along its entire length, an elongated, longitudinally extending control shaft 220 is received for rotation in a side wall 222 (FIG. 8) of the device 194 and in side walls of the adjusting device 214. A bevel gear 224 (FIG. 8) is keyed to shaft 220 and is disposed in driving engagement with the gear 202 of the adjusting device 194 while a similar gearing arrangement on the shaft 220 controls the adjusting device 214. A hand wheel 226 (FIG. 2) is pinned to shaft 220 adjacent the inlet end of the conveyor 22, while a hand wheel 227 is pinned to shaft 220 adjacent the device 194 so that the operator may turn the shaft and adjust the height of the table 74 from either of two locations. All the sprockets of the table adjusting devices are the same size and all gears associated with the same are identical in size, hence each adjusted position of the table 74 will be parallel to all other adjusted positions thereof. By proper vertical adjustment of the table 74, the operator is able to compensate for knife wear so that the band knife 24 will cut completely through the paper logs at all times.

Even though the free end of the strip of paper from which the log is formed is glued or otherwise connected to the log to prevent unrolling of the same, the log may be rather loosely rolled. Therefore, in the machine of the present invention, the log is slightly compressed before it is moved into cutting position. This compression of the logs is accomplished by a log compressing assembly 228 (FIGS. 8 and 12) comprising a pair of vertically extending cone-shaped supports 230 and 232 which are bolted to the table 74 in transversely spaced relation adjacent the front face of the plate 40. Vertically projecting shafts 234 and 236 are secured, as by welding, to the upper ends of the supports 230 and 232, respectively. A horizontally disposed roller shaft 237 is provided with spaced holes 238 and 239 in its opposite end portions for receiving therein the shafts 234 and 236, respectively. A pair of helical compression springs 240 and 242 (FIG. 12) are mounted on each of the shafts 234 and 236 with each spring 240 disposed under the transverse shaft 237 and arranged to contact a shoulder 243 formed in one of the holes 238 or 239 to urge the transverse shaft 237 upwardly. Each spring 242 is disposed above the transverse shaft 237 and is arranged to bear downwardly against a shoulder 244 provided in one of the holes 238 or 239 and to bear upwardly against the lower one of a pair of set collars 245 which are locked on the associated shaft 234, 236. The springs 242 serve to resiliently urge the shaft 237 downwardly. A pair of concave, spaced rollers 246 and 248 are mounted for rotation on the roller shaft 237 and are disposed immediately above the log guide troughs 90 and 92, respectively. Suitable collars 254 are locked on the shaft 237 adjacent the outer ends of the rollers 246 and 248 to prevent axial movement of the rollers on the shaft 237. As the paper logs are conveyed along the troughs 90 and 92, they are forced under their associated rollers 246 and 248 which freely roll over the upper surface of the logs. By the proper positioning of the set collars 245, the resilient compressive efforts of the springs 242 serve to slightly compress the logs and to firmly hold the outer layers thereof in place.

As shown in FIG. 6, the discharge end portion 90a of the trough 90 is separated from the main portion of the trough 90 by a groove 262 which is of sufficient width to permit the cutting run 28 of the band knife 24 to pass therethrough. A similar groove (not shown), which is in lateral alignment with the groove 262, serves to divide the trough 92 into two pieces for the same purpose. The end portion 90a of the trough 90 and the corresponding end portion 92a (FIG. 7) of the trough 92 are angled slightly downward toward their discharge ends in order to cause the cut in the log to open up and provide clearance for the band knife 24 as it cuts through the logs.

Figure 12:
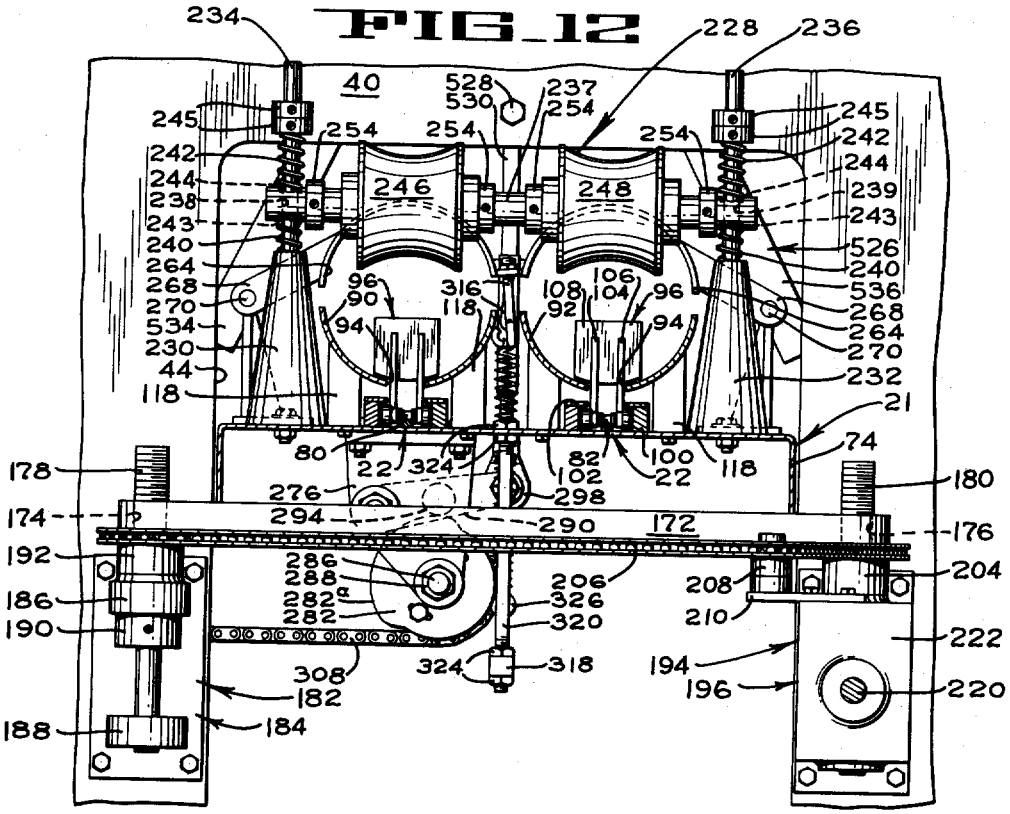
FIGURE 12 is a vertical section taken along line 12—12 of FIG. 3.

After the end portions of the logs pass under the compressing rollers 246 and 248, they are then advanced into the cutting position opposite groove 262 and, after the feed conveyor 22 stops, the end of each log is firmly clamped in cutting position by a clamping assembly 260 (FIGS. 5 and 12). Each clamping assembly 260 comprises two semicylindrical clamping members 264 and 266 (FIG. 6) disposed above the associated guide trough 90 or 92. The member 264 of each clamping assembly is positioned forward or upstream of the groove 262 while the member 266 is placed rearwardly or downstream of the groove 262, and the members 264 and 266 are spaced from each other a distance sufficient to permit the cutting run 28 of the band knife 24 to be lowered therebetween. Since all four of the clamping members 264 and 266 are constructed in an identical manner, the description of one of the forward members 264 (FIG. 5) will suffice for all four members, and similar parts of the other clamping members will be given the same numerals.

The clamping member 264 is welded to a pair of outwardly extending pivoting arms 268 and 269 which are rigidly connected to a pivot pin 270 that extends parallel to the longitudinal axis of the troughs 90 and 92. The pin 270 is mounted for pivotal movement on the upper end of a support member 272 which is bolted to the table 74.

The clamping member 264 is positively raised in timed relation with the intermittent movement of the conveying system 21, by means of a lifting mechanism which includes a bracket 276 (FIGS. 5 and 12) that is bolted to the lower surface of the table 74. A sprocket 280, having a cam 282 bolted thereto, is received for rotation on a shouldered bolt 286 that is rigidly connected to the bracket 276 by a nut 288 (FIG. 12). One end of a lever 290 is pivotally connected to the bracket 276 by means of a bolt 292. A bolt 296 (FIG. 5) is screwed into the lever 290 adjacent the midpoint and rotatably journals a cam follower 294 which rides along the surface of cam 282. A hub 298, having a horizontally disposed, longitudinally extending bar 300 welded thereon, is pivotally mounted on the other end of the lever 290 by a bolt 301. Vertically extending push rods 302 and 304 (FIG. 6) are bolted in fixed position to opposite end portions of the bar 300 and extend upwardly therefrom. A pair of short arms 305 and 305a (FIG. 5) that project laterally from the surface of the two forward clamping members 264, respectively, extend into a groove at the upper end of rod 302. Similarly, two short arms 306 and 306a (FIG. 6), which project laterally from the rear clamping members 266, are disposed in a groove in the push rod 304. Thus, rotation of the sprocket 280 and the attached cam 282 will cause the lobe 282a (FIG. 5) of the cam 282 to contact the follower 294 and force the plungers 302 and 304 upwardly to simultaneously swing all four of the clamping members 264 and 266 upwardly to an open position and hold the members in this position for a predetermined interval of time during each revolution of the sprocket 280.

The clamping assembly 260 is actuated in timed relation with movement of the endless chains 80 and 82 of the feed conveyor 22 by means of a chain 308 which is trained around the sprocket 280 and around one wheel of a double sprocket 307 which is freely rotatable on a stub shaft 309 that is fixed at one end in the plate 40 (FIG. 6). A chain 312 (FIG. 4) is trained around the other wheel of the sprocket 307 and around a sprocket 311 (FIG. 4), which is keyed on the main drive shaft 160. The cam 282 (FIG. 5) is arranged to complete one revolution for each of the intermittent forward movements of the conveyor chains 80 and 82 and is so timed relative to the chains 80 and 82 that the clamping members 264 and 266 are held in the open position while the chains 80 and 82 are moving. The clamping members 264 and 266 are moved into clamping engagement with the logs when the conveyor chains 80 and 82 are not moving, and are maintained in clamping engagement until the knife 24 completes one cut and is again moved upwardly to a position above the logs.

The clamping members 264 and 266 are resiliently held down against the logs, when the chains 80 and 82 are not moving and when the cam follower 294 is opposite the low portion of the cam 282, by means of four tension springs 313 (FIG. 6), one spring being provided for each of the clamping members 264 and 266. Each of the tension springs 313 is secured to its associated clamping member by means of a tab 314 (FIG. 5) which is welded to the member, and an eye bolt 316 which is connected between the spring 313 and the tab 314. For securing the other ends of the springs 313, a horizontally extending bar 318 is positioned below and is rigidly held in spaced relation from the lower surface of the table 74 by a pair of vertical rods 320 and 322 (FIG. 6) each of which is threaded at both ends, and is locked to the table 74 at its upper end and to the bar 318 at the lower end by nuts 324. Each spring 313 is connected to one of several eye bolts 326 which are bolted to the bar 318. With this arrangement the springs 313 are stretched when the cam 282 raises the clamps before the logs are in clamping position and then serve to resiliently force the clamping members 264 and 266 into firm clamping engagement against the upper surface of the logs when the logs reach cutting position. Thus, while individual rolls are being cut from the logs, the logs are firmly held on both sides of the cutting plane, preventing adverse deflection of the logs and preventing binding of the cutting run 28 of the band knife 24.

As the two rolls are being severed from the ends of the logs, the ends are held under a guiding device 330 (FIGS. 6 and 7) which prevents unrolling of sheets of paper from the individual rolls and which bears down on the top of the rolls to force the rolls, as they are being severed from the logs, firmly against the inclined end portions of the troughs 90a and 92a to open up the cut and provide cutting clearance for the band knife 24. The roll guiding device 330 comprises a vertically extending yoke 332 which is arranged to span the table 74 and is bolted to the sides thereof by bolts 333. A rod 334, which forms the upper portion of the yoke 332, extends transversely across and is disposed above the discharge ends of the troughs 90a and 92a. A pair of semicylindrical guide members 336 and 338 are pivotally mounted adjacent their inlet ends on the rod 334 and are disposed in position to contact the upper surface of the rolls of paper supported in the troughs 90 and 92. The guide members 336 and 338 are resiliently urged downwardly by tension springs 340 which are held between the members 336 and 338 and eyebolts 342 that are bolted to the table 74. Thus, the guide members 336 and 338 are pivotally urged downwardly to deflect the ends of the rolls downward against the inclined end portion of the troughs 90a and 92a.

As previously mentioned, the forward end of the inclined discharge plate 30 (FIG. 2) is pivotally connected to the shaft 136 at the discharge end of the feed conveyor 22 by means of the apertured brackets 140. The inclined plate 30 is angled down from the discharge end of the feed conveyor 22 so that the return run of the band knife 24 will be disposed above the path of movement of the rolls even when the knife 24 is in its lowest position. The inclined plate 30 angles upwardly at a point rearwardly of the conveyor drive shaft 142 and has a discharge portion 345 which terminates at approximately the same level as the table 74 of the feed conveyor 22. The discharge portion 345 of the inclined plate 30 (FIGS. 9 and 10) is mounted on a transverse support bar 346 by means of spaced collars 348 which are pivotally supported on the bar 346 and which are welded to the side edges of the slide plate 30. The bar 346 extends between and is bolted to the supporting plates 62 and 64 of the frame. A plurality of longitudinal guide bars 354 are formed to follow the curved configuration of the slide plate 30 and are welded to a plurality of upstanding brackets 355 which are in turn bolted to the plate 30 in such a manner that the bars 354 form continuations of the log guide troughs 90 and 92 and serve to guide the rolls as they are being discharged from the apparatus. As shown in FIGS. 2 and 6, a plurality of short upper guide bars 356 are bolted to two inverted U-shaped brackets 357 and extend over the downwardly inclined portion of the plate 30 to assure a proper transfer of the severed rolls from the horizontal portion of the feed conveyor 22 to the inclined plate 30. The U-shaped brackets 357 are secured, as by bolting, to the plate 30.

The discharge conveyor 34 comprises a pair of spaced flat belts 358 and 360 (FIGS. 9 and 10), each of which is trained around a drive roller 362 and a driven roller 363 that are secured on a drive shaft 364 and a driven shaft 366, respectively. The drive shaft 364 is journalled for rotation in bearings (not shown) which are bolted to the plate 30. The driven shaft 366 is journalled in bearings 372 which are bolted to the plate 30 at the discharge end thereof. Belt tensioning rollers 376 (one only being shown) are disposed in position to contact the lower run of the belts 358 and 360. The rollers 376 are rotatably mounted on arms 380 which are clamped on a shaft 382 which is bolted to the support plates 62 and 64. For driving the discharge conveyor 34, a sprocket 386 (FIG. 10) is keyed to the intermittently driven conveyor shaft 142 while a sprocket 388 is keyed to the shaft 364. A chain 389 is trained around the sprockets 386 and 388 and thus, the discharge conveyor 34 and feed conveyor 22 are intermittently driven at the same time and for the same length of time.

The band knife 24 (FIG. 2) which is provided to sever the logs into a plurality of rolls of predetermined length, is mounted for movement in a generally oval horizontal path (FIG. 3) on a band knife frame or support structure 390 that is mounted above the path of movement of the logs and is arranged to be reciprocated in a vertical direction to lower the horizontally moving blade into engagement with the logs and to thereafter elevate the blade to permit new end portions of the logs to be advanced to a position under the blade. The support structure 390 comprises a generally horizontal plate 391 (FIG. 11) that is generally rectangular in configuration, as seen in plan in FIG. 3. The plate 391 has two spaced upstanding side walls 392 and 393, and each of these walls has two spaced semicylindrical recesses 394 (FIG. 4) formed on its upper end surfaces. A cap 395 is bolted on each upper end surface of the wall so that a semi-cylindrical recess 396 in each cap cooperates with one of the recesses 394 to provide a cylindrical socket or eccentric strap adapted to receive a disc 397 which is keyed in eccentric relation to one of two parallel shafts 398 and 400. Each eccentric disc 397 has a large opening in its central portion and is locked against axial movement in the associated socket by rigid arcuate straps 399 that overlie the edges of the disc and are secured to the cap 395 and the portion of the side wall surrounding the socket. It will be evident that when the shafts 398 and 400 are rotated, the support structure 390 will be raised and lowered relative to the feed conveyor 22.

The shafts 398 and 400 are disposed in parallel relation to the longitudinal axis of the feed conveyor 22. The shaft 398 is journalled for rotation in spaced bearings 402 and 404 (FIG. 3) which are bolted to the plates 40 and 42, respectively, and the shaft 400 is similarly journalled in bearings 406 and 408 also bolted to the plates 40 and 42, respectively. Spaced sprockets 410 and 412 are keyed to the shaft 398 and are positioned adjacent the plates 40 and 42, respectively. The sprocket 410 is in planar alignment with and is connected to a sprocket 414 by a chain 416, and the sprocket 412 is in planar alignment with and is connected to a sprocket 418 by a chain 420. The sprockets 414 and 418 are keyed on the shaft 400. In order to rotate the shafts 398 and 400, a sprocket 422 is keyed to the main drive shaft 160 (FIGS. 3 and 4) and is connected to a sprocket 424 which is keyed on the shaft 398, by a chain 426. An idler sprocket 428 (FIG. 4) is disposed in planar alignment with the sprockets 422 and 424 and is journalled for rotation on an L-shaped bracket 430. The bracket 430 is secured to the plate 40 by means of bolts 432 which project through a slot 434 formed in the bracket 430 and are screwed in tapped holes formed in the plate 40. The idler sprocket 428 meshes with the chain 426 and serves as a tensioning means for the same. As has been previously mentioned, the main drive shaft 160 rotates at a constant speed, rather than intermittently and therefore, the shafts 398 and 400 are continuously driven and are maintained in timed relation with the conveyor 22 by means of the chain 426, and with each other by their interconnecting chains 416 and 420. Thus, as the shafts 398 and 400 are rotated, the frame 390 is reciprocated both vertically and horizontally once for each revolution of the shafts 398 and 400 by means of the four eccentric discs 397.

In order to counterbalance the weight of the knife support frame 390 and the parts supported thereby, counterweights 446 and 448 (FIGS. 2 and 3) are rigidly secured to the shafts 398 and 400, respectively, and several helical compression springs 450 (FIGS. 4 and 11) are arranged to exert an upward force on the frame 390. Each spring 450 is connected at its lower end to one of the spacer bars 48 of the frame by a U-shaped bracket 452 having a hooked lower end portion 454 for grasping the lower end of its associated spring 450. The major portion of the bracket 452 is arranged to extend through the helix of its associated spring 450 and is pivotally connected to its associated spacer bar 48 by means of a link 456. Each spring 450 is connected to the knife support structure 390 by a bracket 458, which is identical to the bracket 452, and which is inserted in its associated spring 450 in a reverse direction from that of the bracket 452 in order to grasp the upper portion of the spring 450. The closed end of the backet 452 is pivotally connected to the knife support structure 390 by a link 460.

The band knife 24 is moved in its generally horizontal oval path by means of a vertically extending drive shaft 462 (FIG. 3) which is rotatably journalled in a bearing housing 464 (FIG. 2) welded to the horizontal plate 391. A large drive wheel 466 is keyed to the lower end of the drive shaft 462 below the plate 391. A sheave 468 is keyed to the upper end of the shaft 462 and is connected by means of V-belts 470 to a drive sheave 472 which is keyed to the drive shaft 474 of a vertical motor 476. The motor 476 is bolted to a suitable mounting stand 477 which is in turn adjustably bolted to the plate 391 by means of bolts 478 which extend through slots 479 formed in the stand 477.

Figure 16:
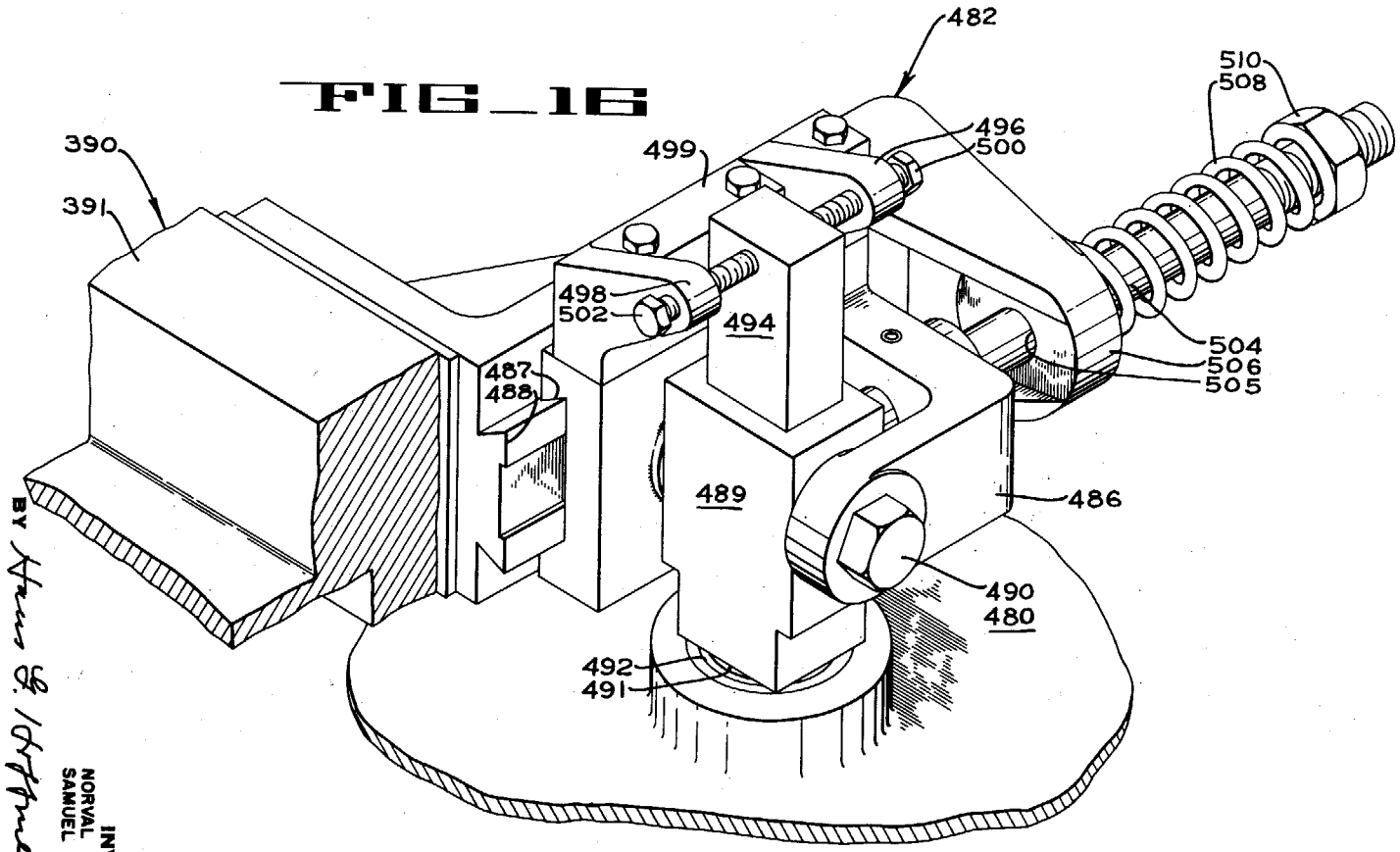
FIGURE 16 is a perspective of a portion of the apparatus taken in the general direction of the arrows 16—16 of FIG. 3.

The band knife 24 is disposed around the periphery of the large drive wheel 466 and around a large driven wheel 480 which is mounted on a bracket 482 that is connected to the support plate 391 by means of bolts 484. A shaft supporting yoke 486 (FIG. 16) having a dovetail mortise 487 formed in one leg thereof, is slidably mounted on a tenon 488 formed on the bracket 482 for movement towards or away from the drive motor 476. A rectangular bar 489 is mounted for pivotal movement on the shaft supporting yoke 486 by a horizontally disposed cap screw 490 which extends through a hole formed in one leg thereof and is screwed into the other leg of the yoke 486. A stub shaft 491 is rigid with and extends downwardly from the rectangular bar 489 to receive the driven wheel 480 which is journalled on the stub shaft 491 by means of suitable antifriction bearings 492 (only one shown). A rectangular tongue 494 is integrally formed on the upper end of the bar 489 and is disposed between upwardly extending bosses 496 and 498 which are formed on a bar 499 that is bolted to the supporting yoke 486. The bosses 496 and 498 are drilled and tapped to receive adjustment bolts 500 and 502 therein. The bolts 500 and 502 are tightened against opposite sides of the tongue 494 and serve to accurately adjust and lock the stub shaft 491 in proper alignment with the knife drive shaft 462 (FIG. 3) for assuring that the band knife 24 will remain on both the drive wheel 466 and driven wheel 480 during the log cutting operation.

A rod 504 (FIG. 16) is rigidly secured to the shaft-supporting yoke 486 and extends through a hole 505 formed in a transversely extending portion 506 of the bracket 482. A helical compression spring 508 is positioned around the rod 504 and is disposed between the portion 506 of the bracket 482 and a nut 510 screwed on the threaded end of the rod 504. The function of the spring 508 is to resiliently urge the supporting yoke 486 and the attached driven knife wheel 480 away from the drive wheel 466 and to maintain proper tensioning on the band knife 24.

Figure 4:
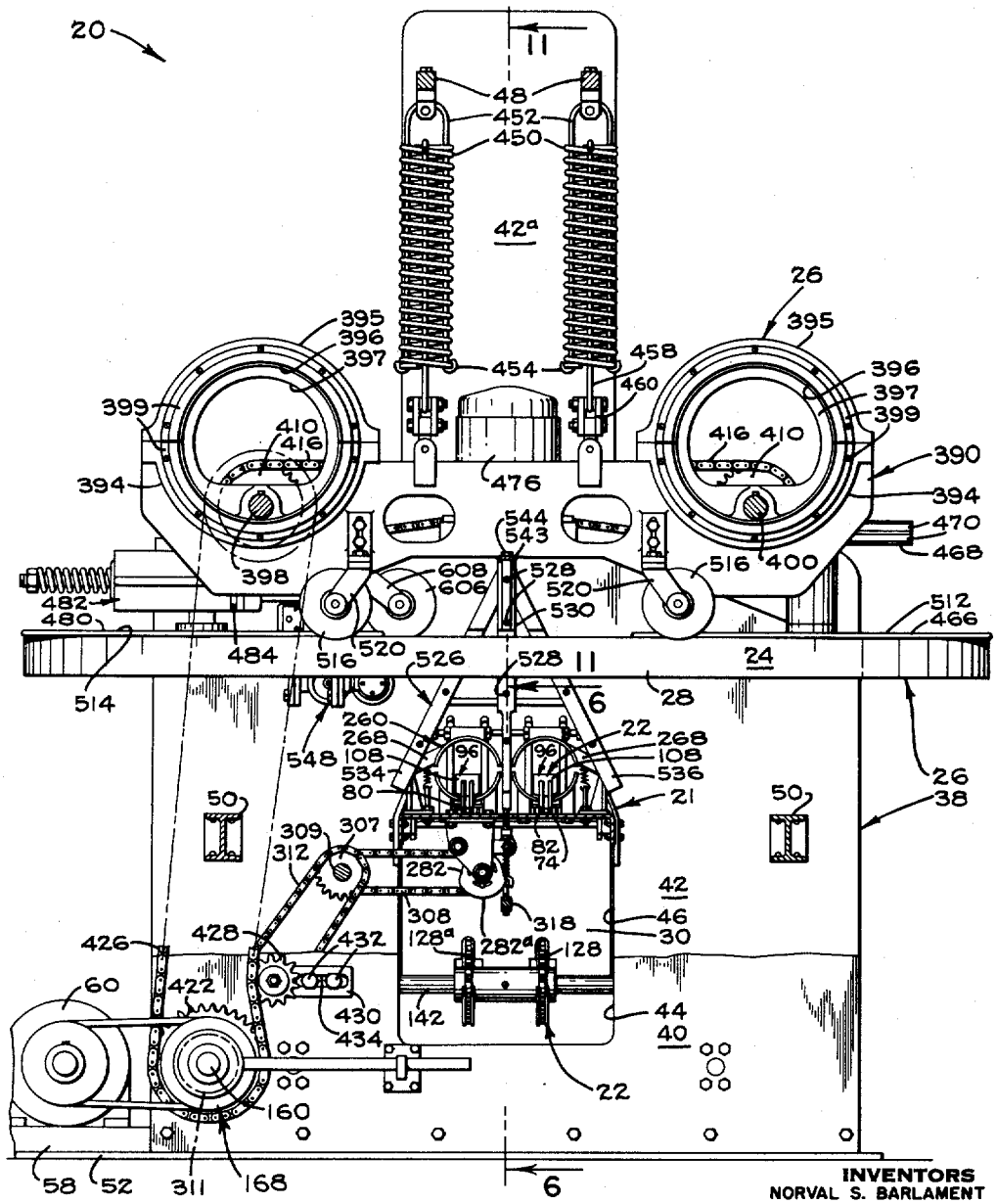
FIGURE 4 is a vertical section taken along line 4—4 of FIG. 2.

As shown in FIG. 4, both the band knife drive wheel 466 and the band knife driven wheel 480 are provided along their upper edges with flanges 512 and 514, respectively, which serve to prevent the band knife 24 from moving upwardly and off the wheels 466 and 480 when subjected to an unexpected upward force against the knife 24. Normally, however, the band knife 24 rides slightly below the flanges 512 and 514 and the cutting run 28 is held in this position by a plurality of grooved guide wheels 516 which are journalled for rotation in brackets 520 that are secured to the side walls of the support plate 391.

Figure 11:
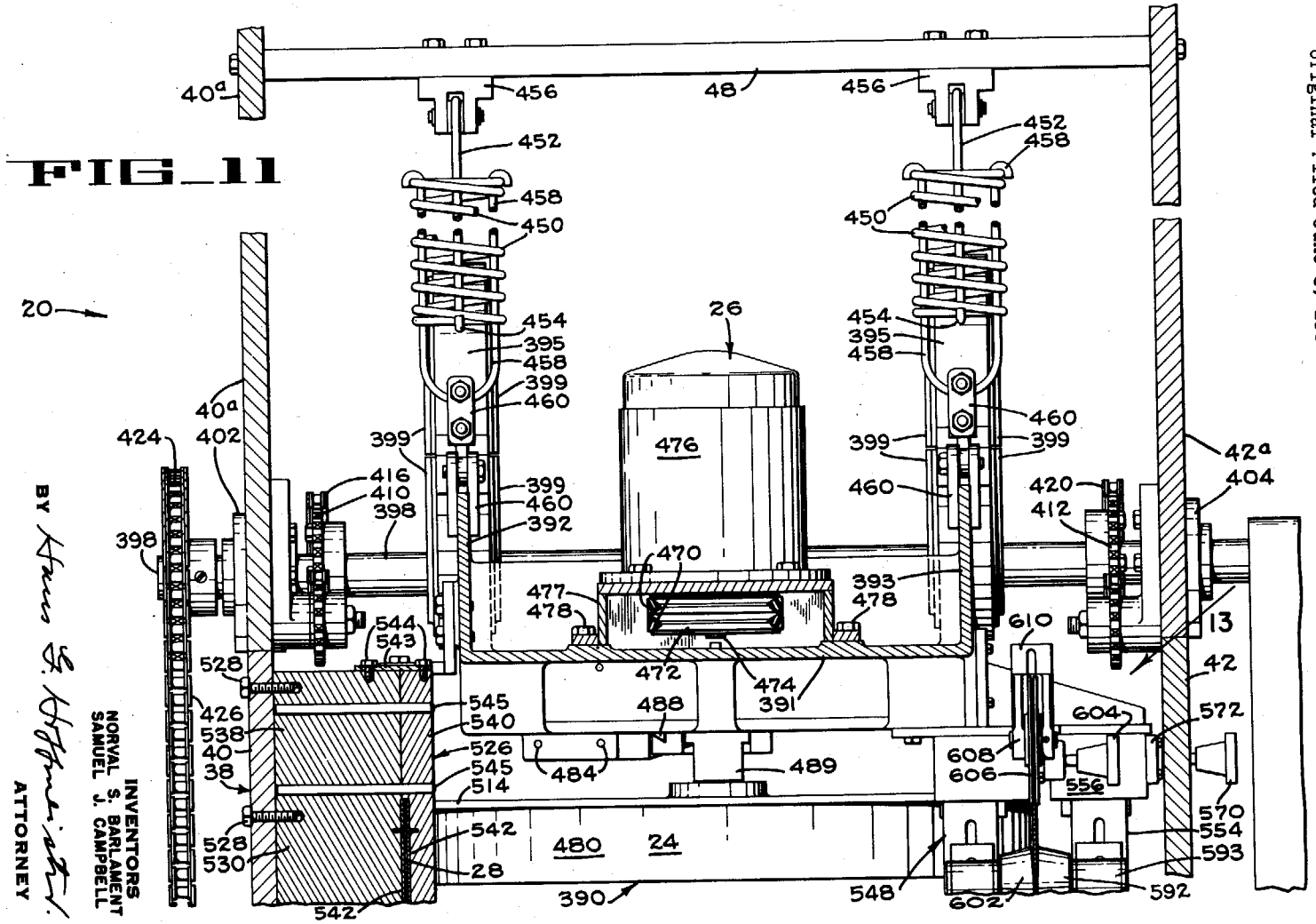
FIGURE 11 is a vertical section taken along line 11—11 of FIG. 4, certain parts being broken away.

Since there is some tendency for the cutting run 28 of the band knife 24 to be deflected laterally from its normal vertical plane during the cutting operation, an inverted, generally V-shaped knife guide 526 (FIGS. 4 and 11) is provided to maintain vertical alignment of the knife 24. The V-shaped knife guide 526 is bolted to the plate 40 of the frame 38 by bolts 528 (FIG. 11) which extend through holes in the plate 40 and are screwed into a central bisecting leg 530 of the V-shaped guide 526. A horizontal gusset plate 532 (FIGS. 3 and 4) is welded to the central leg 530 and to outer legs 534 and 536 of the V-shaped guide 526 to stiffen the same. As is best shown in FIG. 11, the central leg 530 has two sections 538 and 540 which are relieved throughout the entire lower portion thereof to provide a vertical slot through which the cutting run 28 of the band knife 24 passes. The legs 534 and 536 are similarly formed to provide guide slots in alignment with the slot in leg 530. Suitable bearing material 542, such as wood or leather, is secured to the adjacent walls of the slots in the legs 530, 534 and 536 and functions as bearing surfaces against which the knife 24 slides in guided relation. The two sections 538 and 540 of the V-shaped guide 526 are rigidly connected together adjacent the apex end thereof by means of a strap 543 connecting bolts 544, and by suitable dowels 545.

Figure 14:
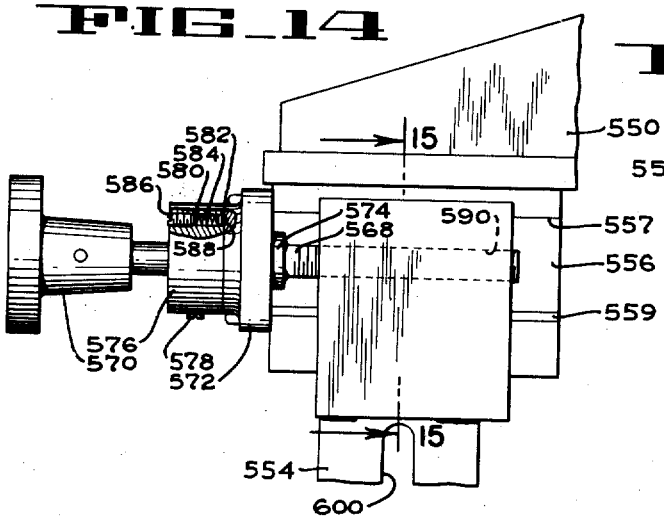
FIGURE 14 is a side elevation of a portion of the structure shown in FIG. 13 taken in the general direction of the arrows 14—14 of FIG. 13, certain parts being shown in section.
Figure 15:
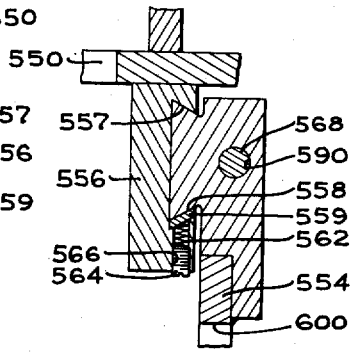
FIGURE 15 is a section taken along line 15—15 of FIG. 14.
Figure 13:
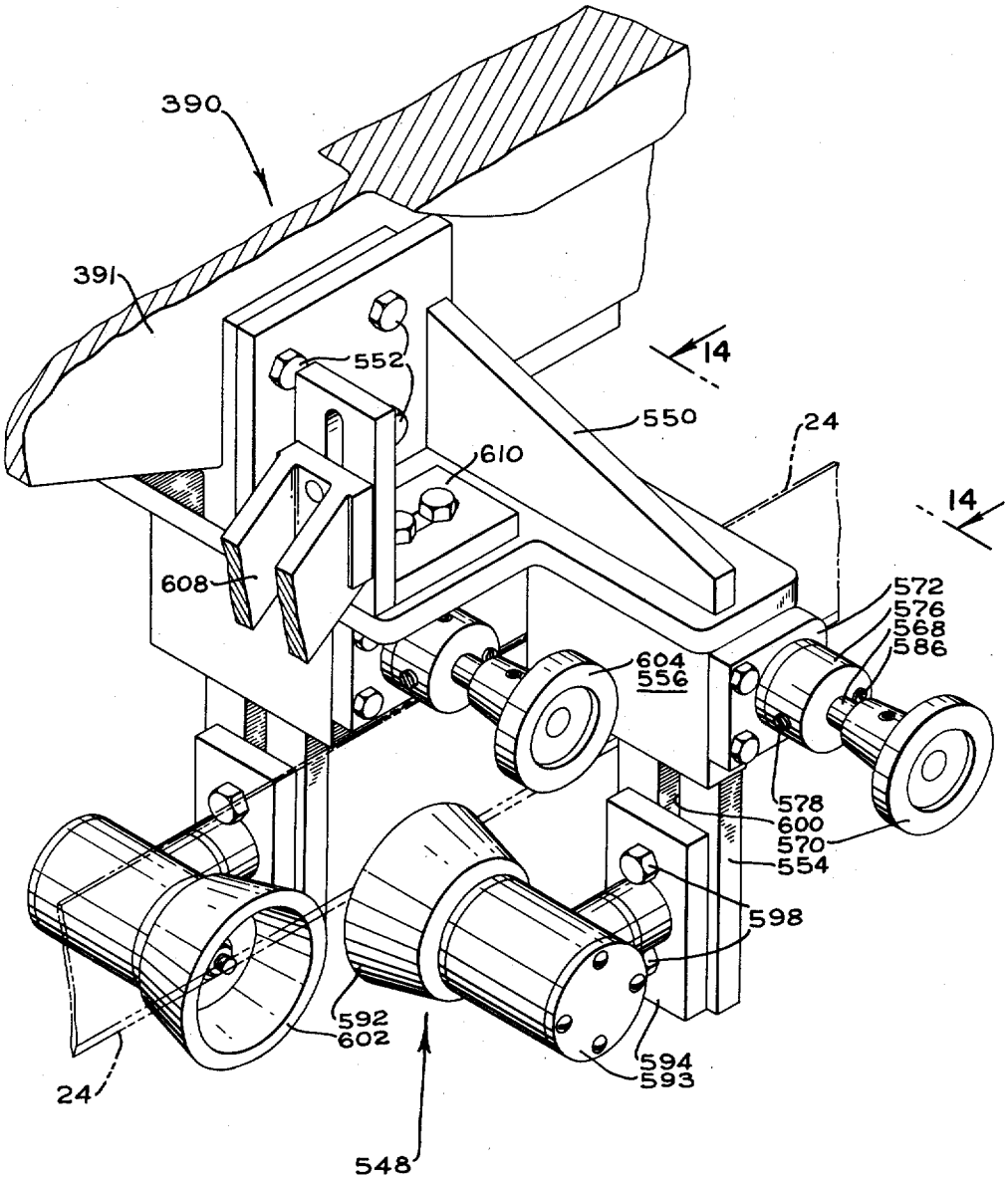
FIGURE 13 is a perspective of a portion of the apparatus taken in the general direction indicated by arrow 13 of FIG. 11.

In order to maintain a fine cutting edge on the knife 24, a knife sharpening device 548 (FIG. 13) is mounted on the support plate 391 and is so positioned as to contact the return run of the band knife 24. The sharpening device 548 comprises a bracket 550 which is mounted on a side wall of the plate 391 by bolts 552. A downwardly projecting arm 554 (FIGS. 13, 14 and 15) is mounted for horizontal movement towards and away from the knife 24 on a vertical member 556 of the bracket 550 by means of a dovetail mortise 557 formed in the member 556 and a mating tenon 558 formed on the upper end of the arm 554. A suitable wear plate 559 is provided in the mortise 557 and is urged against the tenon 558 by means of a spring 562 which is backed by a setscrew 564 screwed into a hole 566 provided in the member 556. A threaded rod 568 (FIG. 14) having a hand wheel 570 pinned on one end thereof is received for free rotation in an apertured block 572 which is bolted to the end of the vertical member 556 of the bracket 550. The rod 568 is held from axial movement relative to the block 572 by a shoulder 574 on the rod which contacts one side of the block 572, and by a hub 576 which is secured to the rod by means of a setscrew 578 and contacts the other side of the block 572. A hole 580 is drilled axially through the hub 576 and receives therein an indexing ball 582, a spring 584 for exerting pressure on the ball 582 and a setscrew 586 for maintaining pressure on the spring 584. A plurality of depressions 588 (only one being shown in FIG. 14) are formed in the block 572 and each of the depressions 588 is arranged, in turn, to receive the ball 582 therein as the rod 568 is rotated to hold the rod 568 in adjusted position. The threaded end of the rod 568 is received in a threaded hole 590 (FIG. 15) which is formed in the arm 554. Thus, rotation of the rod 568 by means of the hand wheel 570 will cause the arm 554 to move towards or away from the knife 24 depending upon the direction of rotation of the rod 568. A grinding wheel 592 (FIG. 13) is journalled for free rotation in a bearing housing 593 which is rigidly connected to a mounting plate 594. The mounting plate 594 is connected to the arm 554 by means of bolts 598 which extend through a slot 600 formed in the arm 554 and through holes formed in the plate 594 to thereby provide means of vertically adjusting the grinding wheel 592. The axis of rotation of the grinding wheel 592 is disposed slightly below the cutting edge of the knife 24 and is canted relative to the knife 24 in such a manner that the grinding wheel 592 is contacted by the knife 24 at only one point on the periphery of the wheel 592. Thus, as the knife 24 is moved past the grinding wheel 592, the wheel 592 is caused to rotate by the off-centered contact made between the knife 24 and the wheel 592. One side of the cutting edge of the knife 24 is thereby maintained in a sharpened condition by contact with the wheel 592.

A second grinding wheel 602 is adjustably mounted on the bracket 550 and is disposed in position to contact and sharpen the other side of the cutting edge of the knife 24. Since the grinding wheel 602 and the structure for mounting the same is similar to that associated with the grinding wheel 592, a detailed description of these parts will be omitted. The grinding wheel 602 is arranged to be moved towards or away from the knife 24 by means of a handwheel 604.

A grooved roller 606 (FIG. 11) is mounted for rotation in a forked bracket 608 which is bolted to an angle member 610 that is, in turn, bolted to the bracket 550. The grooved roller 606 is positioned above the grinding wheels 592 and 602 (FIG. 13) and contacts the upper surface of the knife to prevent upward movement thereof. Suitable wooden knife guides (not shown) may be mounted to the bracket 550 on opposite sides of the knife 24 to prevent deflection of the same in the region of the sharpening device 548. The knife 24 may be sharpened continuously during the operation of the log cutting apparatus 20 by setting the grinding wheels 592 and 602 in light contact with the knife 24, or, the knife 24 may be sharpened intermittently when and as desired by periodically advancing the grinding wheels 592 and 602 against the knife 24.

In the operation of the log cutting apparatus 20 of the present invention, the knife 24 is driven continuously and at a rapid speed by the motor 476 in the direction of the arrow B in FIG. 3. At the same time, the shafts 398 and 400 and the eccentrics 397 mounted thereon are continuously rotated by the main motor 60 in a counterclockwise direction, as viewed in FIG. 4, to vertically reciprocate the knife support structure 390. Thus, the knife is continuously reciprocated vertically and, simultaneously therewith is reciprocated horizontally in such a manner that the entire knife 24 moves in the direction of movement of the cutting run 28 thereof, i.e., to the right in FIG. 4, during the cutting operation. Therefore, the feeding force exerted by the cutting run 28 of the knife 24 against the logs being cut is directed downwardly and to the right, as viewed in FIG. 4, during the cutting operation.

It will be apparent that the entire knife 24 and its support structure 390 are moved in a circular path by the eccentrics 397 and that this movement is used to advantage because it supplements the normal speed of the cutting run of the knife during the cutting operation [and otherwise results in a better cutting action]. *Also, better cutting action results because the orbital reciprocatory movement of the knife is smoother than pure vertical reciprocatory movement. In turn, with this smoother movement, higher speeds are possible so that more log cuts per unit of time can be obtained than with the pure vertical reciprocatory movement; it is to be understood that the speed last referred to is that of the support frame 390 and knife 24 around shafts 398 and 400. There is still another reason why better cutting results. Thus, with the circular motion, as the knife completes the cut through the log the vertical speed of the knife relative to the log is approaching nil. Because the knife is moving at this slow vertical speed, there is less tendency to tear or rip the outer ply of the wound roll. In other words, the slower vertical speed permits the knife to cut through the outer plies rather than to tear or rip through them. Tearing or ripping is not a factor at the beginning of the cut and throughout the major portion of the cut inasmuch as the uncut portion of the log forms a backup and prevents tearing. As the cut is being completed, however, there is nothing to back up the outer plies so that tearing is possible at the higher vertical speeds.*

As the band knife 24 is being driven continuously in the above described manner, the feed conveyor 22 (FIGS. 2 and 3) and the discharge conveyor 34 are driven intermittently by the motor 60 through the intermittent driving unit 154. Logs of rolled paper L placed in the trough 90 and 92 are contacted and are are intermittently moved by the pushers 96 on the chains 80 and 82 a distance equal to the desired roll length for each forward movement of the feed conveyor 22. The overall length of the logs and the spacing of the pushers 96 are so determined that the initial cut on the logs is a trimming cut and severs only a small portion from the leading ends of the logs to provide a squared end, and similarly, the last cut on the logs trims a small portion therefrom to provide another squared end.

During the intermittent travel of the logs along the conveying system 21, the logs are first intermittently advanced by the feed conveyor 22 under the concave rollers 246 and 248 (FIG. 8) of the compressing assembly 228 which slightly compress the logs and prevent the outer paper layers of the logs from unrolling. The ends of the logs are then advanced under the clamping assembly 260 and under the overhead guide members 336 and 338 of the guiding device 330 (FIG. 7) as the knife assembly 26 is being moved through that portion of the cycle wherein the band knife 24 is in an elevated position above the logs. After the conveyor 22 has stopped, the clamping members 264 and 266 (FIG. 6) are firmly clamped on the logs by the urging of the springs 313 and remain clamped thereon during the cutting operation of the knife 24. During the cutting operation, the members 336 and 338 of the guiding device 330 bear down on the end portions of the logs to force these end portions against the inclined end portion of the troughs 90 and 92, thereby providing cutting clearance for the band knife 24. When the cut has been completed and the knife 24 has again been moved to an elevated position above the upper surface of the logs, the clamping members 264 and 266 are cammed upwardly out of engagement with the logs and the severed rolls. The severed rolls are held in compact condition by the guide members 336 and 338 of the roll guiding device 330 until the severed rolls are advanced onto the inclined portion 30 of the feed conveyor 22 by the next forward movement of the logs. The intermittent driving unit 154 (FIG. 3) then causes the chains 80 and 82 to advance a distance equal to the desired roll length and the above described operations are repeated. The rolls which have been severed from the logs are forced down the inclined slide plate 30 by the intermittently advancing logs and are later received and advanced from the log cutting apparatus 20 by the discharge conveyor 34 (FIG. 2) which is intermittently driven in timed relation with the feed conveyor 22.

During the above described operation, the band knife 24 is maintained in a sharpened condition by the grinding wheels 592 and 602 (FIG. 13) which may be moved toward and away from the knife 24 by adjustment of the hand wheels 570 and 604, respectively. The grinding wheels may be adjusted so as to sharpen the knife continuously or may be moved into engagement with the knife 24 to intermittently sharpen the same. As the knife 24 becomes worn and as its width is reduced by continuous usage, the table 74 of the feed conveyor 22 is raised by turning either the hand wheel 226 (FIG. 2) or the hand wheel 227 in the proper direction, thus assuring complete severage of the rolls from the logs.

From the foregoing description it is apparent that the log cutting apparatus of the present invention provides improved means for manufacturing paper articles by cutting logs of rolled paper into a plurality of individual rolls. The use of a reciprocating, continuously moving band knife for automatically and rapidly severing paper logs into a plurality of individual rolls of paper makes possible the production of rolls with a minimum of tearing and telescoping of the rolls. Further, the novel means for automatically maintaining a sharp cutting edge on the knife at all times and the means for adjusting the depth of cut of the knife to compensate for knife wear contribute greatly in providing a machine which can be operated without loss of production time for performing these operations.

Although the operation of the apparatus of the present invention has been described with reference to cutting rolled logs of paper into individual rolls, it is to be understood that the machine can be easily adapted to cut logs of folded paper or logs of stacked sheets of paper into individual packets. The only alteration of the apparatus necessary to accomplish this is to alter the paper contacting surfaces to conform to the shape of the log.

While one embodiment of the present invention has been shown and described, it will be understood that various changes and modifications may be made without departing from the spirit of the invention or scope of the appended claims. Having thus described the present invention and the manner in which the same is to be used, what we claim as new and desire to protect by Letters Patent is:

1. In an apparatus for cutting a log of rolled paper into a plurality of sections, a log supporting trough having a transverse slot formed therein, a continuously driven band knife, means mounting said band knife above said trough for vertical reciprocatory movement through said slot, a clamp positioned on each side of said slot and above said supporting trough and mounted for pivotal movement toward or away from said supporting trough, resilient means connected to each of said clamps and arranged to pivotally move said clamp into clamping engagement on a log supported by said trough, a cam mounted for rotation below said trough, a lever mounted for pivotal movement and positioned between said trough and said cam, a cam follower mounted for rotation on said lever and positioned to ride against said cam to pivotally raise and lower one end of said lever, a linkage connected between said one end of the lever and both of said clamps and arranged upon upward pivotal movement of said lever to force said clamps away from the log against the urging of said resilient means, and power means connected to said knife mounting means and to said cam for reciprocating said band knife through said slot during the interval when said one end of the lever is in its lower position.

2. An apparatus for cutting a log of rolled paper or the like into a plurality of sections, a pair of parallel spaced shafts mounted for rotation, power transmitting means interconnecting said shafts, a pair of eccentrics keyed on each of said shafts, an eccentric strap for rotatably receiving each eccentric, a frame fixed to and supported by said eccentric straps, a pair of spaced band wheels mounted for rotation on said frame, a band knife trained around said band wheels and having a cutting run, drive means mounted on said frame and connected to one of said band wheels to continuously drive the same and to move said cutting run in a predetermined direction, conveying means for intermittently moving a log below said cutting run of said band knife, intermittent drive means for said conveying means, movable clamping means positioned adjacent to said conveying means and having a slot therein extending laterally of said conveying means, drive means connecting said clamping means to said intermittent drive means for moving said clamping means into clamping engagement with the log when said conveyor is stationary, and drive means connected to said intermittent drive means and to one of said shafts to rotate the shafts and the eccentrics in timed relation to the movement of said conveying means for causing said cutting run of said band knife to reciprocate through said slot and said log when said conveying means is stationary, said last mentioned drive means effecting movement of said frame and said cutting run in said predetermined direction when said cutting run is severing said log.

3. An apparatus for cutting a log of paper or the like into a plurality of sections of predetermined length comprising a frame, a conveyor supported by said frame for moving the log of paper in a predetermined direction, intermittent drive means connected to said conveyor for driving said conveyor, a pair of spaced horizontally disposed shafts journalled on said frame with their axes parallel to the longitudinal axes of said conveyor, a pair of eccentrics keyed on each of said shafts, an eccentric strap for rotatably receiving each of said eccentrics, a band knife supporting frame rigidly secured to said straps, a band knife mounted on said band knife frame above said conveyor and having a cutting run, means carried on said band knife frame and connected to said band knife for continuously driving said cutting run in a predetermined direction, clamping means positioned adjacent to said conveyor for movement into engagement with the log, and drive means connecting said conveyor drive means to both of said shafts and to said clamping means for moving said clamping means into clamping engagement with the log and for moving said band knife supporting frame in a circular path in a vertical plane in timed relation to the movement of said conveyor whereby said cutting run of the band knife is moved through the log to sever a section therefrom when said conveyor is stationary, said movement of said band knife frame in said circular path causing said cutting run to move in said predetermined direction while severing the log.

4. An apparatus for cutting a log of paper or the like into a plurality of sections of predetermined length comprising a frame, a conveyor supported by said frame for moving the log of paper in a predetermined direction, intermittent drive means connected to said conveyor for driving said conveyor, a pair of spaced horizontally disposed shafts journalled on said frame with their axes parallel to the longitudinal axis of said conveyor, a pair of eccentrics keyed on each of said shafts, an eccentric strap for rotatably receiving each of said eccentrics, a band knife supporting frame rigidly secured to said straps, a continuously driven band knife mounted on said band knife frame and having a cutting run operable in a vertical plane, drive means on said band knife frame connected to said band knife for moving said cutting run in a predetermined direction laterally of said conveyor, movable clamping means positioned adjacent said conveyor and having a slot therein extending laterally of said conveyor and lying in the vertical plane of said cutting run, and drive means connecting said conveyor drive means to both of said shafts and to said clamping means for moving said clamping means into clamping engagement with the log and for moving said band knife supporting frame in a circular path in a vertical plane in timed relation to the movement of said conveyor whereby said cutting run of the band knife is moved through said slot and the log to sever a section therefrom when the log is clamped and when said conveyor is stationary, said predetermined direction in which said cutting run of the band knife is continuously driven being the same as the direction of movement of the knife supporting frame in said circular path when said knife is severing the log.

*5. In an apparatus for transversely cutting a log of material, said apparatus including a support, means in said support for clamping a log to-be-cut in a cutting position, and an endless band knife having a cutting run; a frame, means mounting said knife in said frame for circuitous travel relative to said frame, means mounting said frame in said support with said cutting run spaced from said clamping means and extending transversely of said log and for orbital movement of said frame about an axis extending transversely of said run thereby to move said run simultaneously vertically and transversely relative to said clamping means, powered means connected to said knife mounting means for moving said cutting run in a predetermined direction across a log to-be-cut, and powered means connected to said frame mounting means for orbiting said frame so that as said cutting run cuts into a log the frame is also moving vertically and transversely.*

*6. In an apparatus for forming transverse cuts through an elongate work piece comprising a cutter support, an endless band cutter mounted for circulation on said support, said cutter having a rectilinear cutting run, means for circulating said cutter relative to said support, and means translating said support for maintaining said cutting run in a plane normal to the longitudinal axis of the work piece and wherein the translatory movement of said support includes velocity components contained in the normal plane directed along and normal to the cutting run of said cutter, said support translating means moving said cutter to complete a cut through the work piece when the magnitude of the normal velocity component is substantially zero and the magnitude of the velocity component along the cutting edge is substantially equal to its maximum value, wherein the velocity of the cutting run and the translational velocity component of said support are directed along said cutting run yielding a sum increasing the velocity of the cutting run relative to the work piece.*

*7. In an apparatus for transversely cutting a log of material, said apparatus including a main support, means on said main support for holding a log in a cutting position, and a cutting member having a cutting edge; an auxiliary support, first means mounting said cutting member on said auxiliary support for circuitous travel of the cutting edge relative to said auxiliary support, second means mounting said auxiliary support on said main support so that said cutting member and holding means are vertically related to each other and so that said cutting edge lies in a plane extending transversely of said log; said second means mounting said auxiliary support for movement in an orbit about an axis extending transversely of said edge thereby to move said edge toward and away from said holding means into and out of engagement with a log held thereby, powered means for imparting said travel to the cutting edge, and powered means for moving said auxiliary support and thus said cutting member in said orbit with substantially constant angular speed so that as said cutting edge cuts into a log, the vertical component of said speed is greater than the horizontal component thereof, so that as said edge progresses through the log, said vertical and horizontal components respectively decrease and increase, and so that as said edge approaches the end of its cut and completes the same, said vertical component decreases to a value that is substantially less than at the beginning of the cut.*

*8. In an apparatus for transversely cutting a log of material which includes a plurality of circumferential layers constituting a wound roll and wherein the outermost layers are subject to tearing during completion of the cutting action, means for holding a log in a cutting position, and a cutting member having a cutting edge, the improvement comprising a support, first means mounting said cutting member on said support for circuitous travel of the cutting edge relative to said support, second means mounting said support so that said cutting member and log are spaced one above the other prior to cutting engagement of the member with the log and so that said cutting edge lies in a plane extending transversely of said log, said second means mounting said support for movement in an orbit about an axis extending transversely of said edge thereby to move said edge toward and away from said holding means into and out of engagement with a log held thereby, powered means for imparting said travel to the cutting edge, and powered means for moving said support and cutting member in said orbit with substantially constant angular speed and so that the magnitude of the vertical component of said angular speed during initial engagement of the cutting member with the log is substantially greater than said vertical component upon completion of cutting of the log by the cutting member.*

*9. In an apparatus for transversely cutting a wound roll of material made up of overlaid layers, said roll being located in a cutting position, said apparatus including a support and a cutting member having a cutting edge; the combination of first means mounting said cutting member on said support for circuitous travel of the cutting edge relative to said support, second means mounting said support so that said cutting edge lies in a plane extending transversely of said roll, said second means mounting said support and cutting member for movement in an orbit about an axis extending transversely of said edge thereby to elevationally move said edge into and out of engagement with said roll, power means for imparting said travel to the cutting edge, and powered means for moving said support and cutting member in said orbit with substantially constant angular speed and so that as said cutting edge cuts into and progresses through the roll, the vertical and horizontal components of said speed respectively decrease and increase whereby upon completion of the cut, the vertical component is approaching zero in order to prevent tearing of the unsupported outermost layers of the roll.*

*10. The combination of claim 9 wherein means positions said roll in such relation to the orbit of the cutting member and said powered means moves said cutting*

*member in such a manner that upon initial engagement of the cutting member with the roll said vertical component is substantially at its maximum value and said horizontal component is substantially zero and upon completion of said cut said horizontal component is approaching its maximum value.*

*11. In an apparatus for cutting a roll of sheet material, such as paper, wherein outermost layers of the roll have a tendency to tear upon completion of a transverse cut through the roll, said apparatus including a cutting member having a cutting edge; the combination of first means mounting said cutting member for circuitous travel of the cutting edge, second means mounting said first means and cutting member so that said cutting edge is movable in a closed path a portion of which is an arc concentric to an axis that extends transversely of said edge, means for holding said roll in said arc portion of the path so that the cutting edge makes a transverse cut in the roll as the cutting edge moves along said arc portion, first powered means for imparting said travel to the cutting edge, and second powered means for moving said first means and cutting edge in said closed path, said second powered means moving said cutting edge at a substantially constant angular speed along said arc portion of the path, said angular speed being resolvable into a power component which is directed towards said roll and which acts to force the cutting edge more deeply into the roll and into a translating component which is perpendicular to said power component, whereby said power component progressively decreases as the number of uncut layers of said roll ahead of said edge progressively decreases, said power component eventually approaching zero as the edge completes its cut, said outermost unsupported layers being thereby cleanly cut instead of irregularly torn by the cutting member.*

References Cited by the Examiner

The following references, cited by the Examiner, are of record in the patented file of this patent or the original patent.

UNITED STATES PATENTS

| | | | |
|---|---|---|---|
| 226,904 | 4/80 | Culver | 83—483 |
| 764,717 | 7/04 | Foshee. | |
| 999,475 | 8/11 | Wilkin. | |
| 1,001,272 | 8/11 | Howard. | |
| 1,084,801 | 1/14 | Hunter. | |
| 1,088,573 | 2/14 | Heldmann. | |
| 1,813,291 | 7/31 | Herbold. | |
| 1,926,990 | 9/33 | Schmidt. | |
| 2,104,258 | 1/38 | Hunter et al. | 83—201 |
| 2,149,430 | 3/39 | Fleming. | |
| 2,274,923 | 3/42 | Hedgpeth. | |
| 2,293,721 | 8/42 | Engler. | |
| 2,390,340 | 12/45 | Webb. | |
| 2,391,719 | 12/45 | Llewellyn | 83—646 |
| 2,478,485 | 8/49 | Hewitt. | |
| 2,482,685 | 9/49 | Moyer. | |
| 2,497,488 | 2/50 | Cashwell. | |
| 2,546,390 | 3/51 | Donner. | |
| 2,647,576 | 8/53 | Marcalus. | |
| 2,687,153 | 8/54 | Moore. | |
| 2,692,645 | 10/54 | Driesch | 83—490 |
| 2,752,999 | 7/56 | Gage. | |
| 2,801,458 | 8/57 | Remmen | 83—490 |

ANDREW R. JUHASZ, *Primary Examiner.*

WILLIAM W. DYER, *Examiner.*